(12) United States Patent
Hirabayashi et al.

(10) Patent No.: US 7,791,835 B2
(45) Date of Patent: Sep. 7, 2010

(54) MULTI-CHANNEL HEAD

(75) Inventors: Hiraku Hirabayashi, Tokyo (JP);
Kazuhiko Maejima, Tokyo (JP);
Tomonaga Nishikawa, Tokyo (JP)

(73) Assignee: TDK Corporation, Tokyo (JP)

( * ) Notice: Subject to any disclaimer, the term of this patent is extended or adjusted under 35 U.S.C. 154(b) by 601 days.

(21) Appl. No.: 11/772,562

(22) Filed: Jul. 2, 2007

(65) Prior Publication Data
US 2008/0100961 A1    May 1, 2008

(30) Foreign Application Priority Data
Oct. 30, 2006    (JP)    ............................. 2006-294379

(51) Int. Cl.
*G11B 5/31*    (2006.01)
(52) U.S. Cl. ..................................... 360/121
(58) Field of Classification Search ........................ None
See application file for complete search history.

(56) References Cited

U.S. PATENT DOCUMENTS 6,757,134 B2 *    6/2004    Emilio Santini    ....... 360/125.52

7,009,812 B2 *    3/2006    Hsu et al.    ............... 360/125.12
7,405,905 B2 *    7/2008    Kimura et al.    ......... 360/125.17

FOREIGN PATENT DOCUMENTS

| JP | 61-175917 | 8/1986 |
| JP | 02-005214 | 1/1990 |
| JP | 2005-276267 | 10/2005 |

OTHER PUBLICATIONS

U.S. Appl. No. 11/868,699, filed Oct. 8, 2007, Maejima, et al.

* cited by examiner

*Primary Examiner*—Mark Blouin
(74) *Attorney, Agent, or Firm*—Oblon, Spivak, McClelland, Maier & Neustadt, L.L.P.

(57) ABSTRACT

A multi-channel head includes a substrate and a plurality of recording elements arranged on the substrate in a track width direction. At least one of the recording elements satisfies BGW<PW and BGD>BGW, where PW represents a pole width, BGW and BGD represent a width and a depth, respectively, of a back yoke.

2 Claims, 6 Drawing Sheets

MULTI-CHANNEL HEAD

BACKGROUND OF THE INVENTION

1. Field of the Invention

The present invention relates to a multi-channel head.

2. Description of the Related Art

In the computer field, data storage devices for performing recording/reproducing of magnetic information on a linear tape have been developed as a device for backing up data stored in a memory, a hard disk or the like. Japanese Unexamined Patent Application Publication No. 2005-276267 discloses a multi-channel head to be used in such a data storage device.

Such a multi-channel head is provided with a plurality of element pairs each composed of one recording element and one reproducing element. These element pairs are arranged on a substrate of the multi-channel head in a direction perpendicular to a linear tape travel direction. Each element pair serves as one channel that is a unit of performing recording/reproducing of magnetic information.

Moreover, the recording element of each element pair is aligned with the recording element of an adjacent element pair in the direction perpendicular to the linear tape travel direction. The recording element performs recording of magnetic information by applying a recording magnetic field to the linear tape.

SUMMARY OF THE INVENTION

In recent years, in association with an increase in capacity of a memory, a hard disk or the like, an improvement in recording speed has also been demanded in the multi-channel head, e.g., for recording more magnetic information on the linear tape within a given period of time. In order to improve the recording speed, it is effective to increase the number of channels by arranging as many recording elements as possible within a given width taken along a direction perpendicular to the linear tape travel direction. In this case, it is desirable that the arranged recording elements can generate a sufficient recording magnetic field even though having a small pitch distance between adjacent recording elements.

It is an object of the present invention to provide a multi-channel head which can generate a sufficient recording magnetic field even though having a small pitch distance between adjacent recording elements.

In order to achieve the above object, a multi-channel head according to the present invention comprises:

a substrate; and a plurality of recording elements arranged on the substrate in a track width direction, each recording element comprising:

a first yoke having a first pole on a side close to a medium-facing surface of the substrate;

a second yoke being spaced apart from the first yoke in a lamination direction of the substrate and having a second pole on a side close to the medium-facing surface;

a back yoke being located behind the medium-facing surface in a depth direction perpendicular to both the lamination direction of the substrate and the track width direction and connecting the first yoke and the second yoke; and a coil being wound around the back yoke, wherein at least one of the recording elements satisfies BGW<PW and BGD>BGW, where PW represents a shorter one of a width of the first pole taken along the track width direction at the medium-facing surface and a width of the second pole taken along the track width direction at the medium-facing surface, BGW represents a width of the back yoke taken along the track width direction, and BGD represents a depth of the back yoke taken along the depth direction.

Preferably, at least one of the recording elements further satisfies BGW/PW≧0.24.

Since at least one of the recording elements satisfies BGW<PW and BGD>BGW, there can be provided a multi-channel head which can generate a sufficient recording magnetic field even though having a small pitch distance between adjacent recording elements.

The present invention will be more fully understood from the detailed description given hereinbelow and the accompanying drawings which are given by way of illustration only, and thus are not to be considered as limiting the present invention.

DESCRIPTION OF THE PREFERRED EMBODIMENTS

Figure 1:
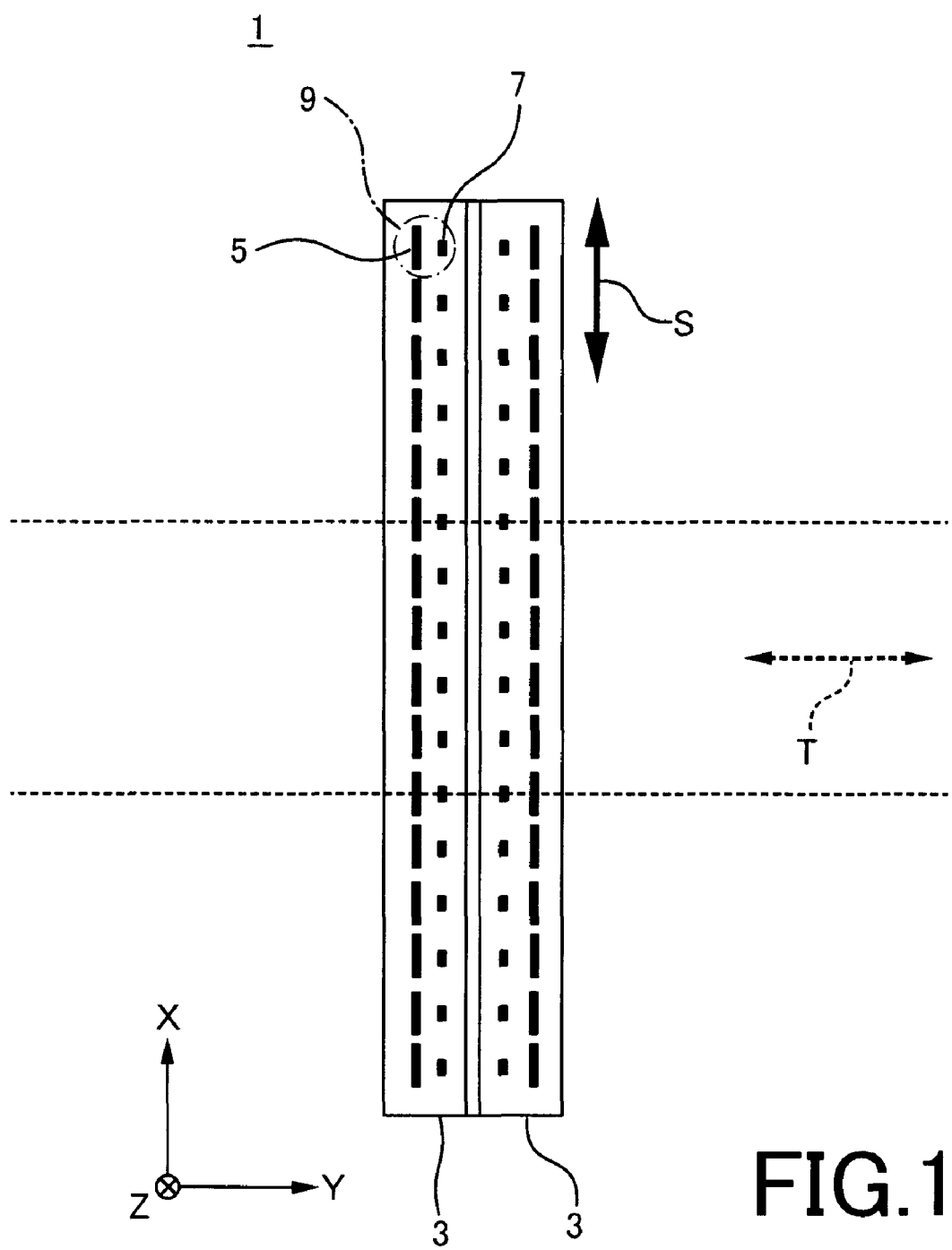
FIG. 1 is a view showing a multi-channel head according to one embodiment of the present invention.

FIG. 1 is a view showing a multi-channel head 1 according to one embodiment of the present invention. The illustrated multi-channel head 1 may be used as a magnetic head for performing recording/reproducing of magnetic information on a linear tape in a magnetic tape recorder such as of LTO (linear tape-open) technology for backing up data stored in a memory, a hard disk or the like of a computer.

The multi-channel head 1 is constructed by symmetrically bonding together two strip-shaped head chips 3. Each head chip 3 has a plurality of write elements 5 and a plurality of read elements 7. More specifically, there are provided sixteen element pairs 9, wherein each element pair 9 is composed of one recording element 5 and one reproducing element 7. The element pairs 9 each serves as one channel that is a unit of performing recording/reproducing of magnetic information and are arranged in a track width direction X. The track width direction X is a shift direction S of the multi-channel head 1 and substantially perpendicular to a travel direction T of a linear tape 11.

Figure 2:
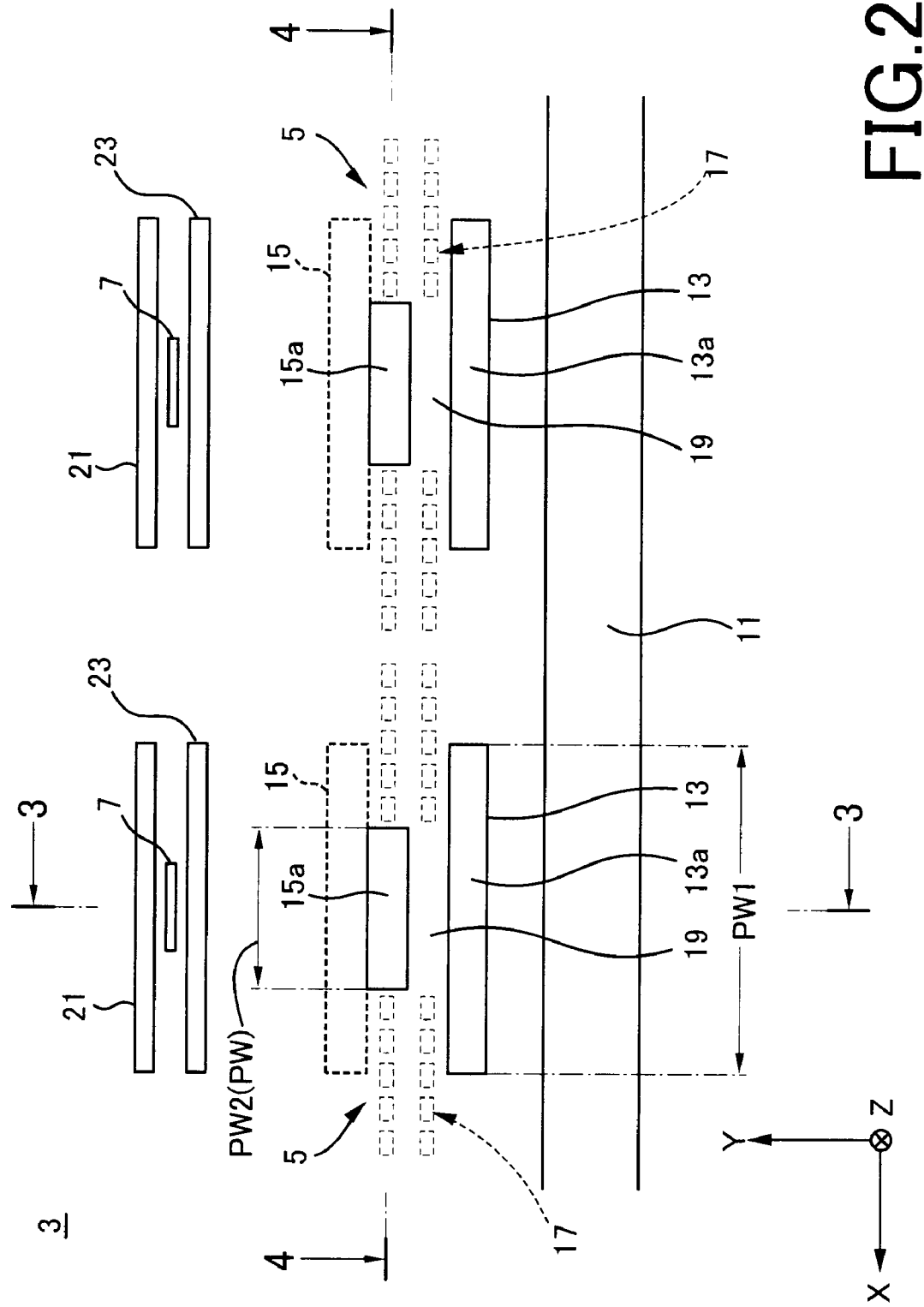
FIG. 2 is an enlarged view of a few element pairs in a head chip as seen from a medium (linear tape)-facing surface side.

FIG. 2 is an enlarged view of a few (two) element pairs in a head chip as seen from a medium (linear tape)-facing surface side. The head chip 3 has a layered structure of a plurality of films. Above a substrate 11 in a lamination direction Y, recording elements 5 are arranged in the track width direction X. Above the recording elements 5, moreover, reproducing elements 7 are arranged in the track width direction X. Since all the reproducing elements 7 are of the same structure and all the recording elements 5 are of the same structure, the following description will be made only of one reproducing element 7 and one recording element 5 shown on the left side in FIG. 2.

Figure 3:
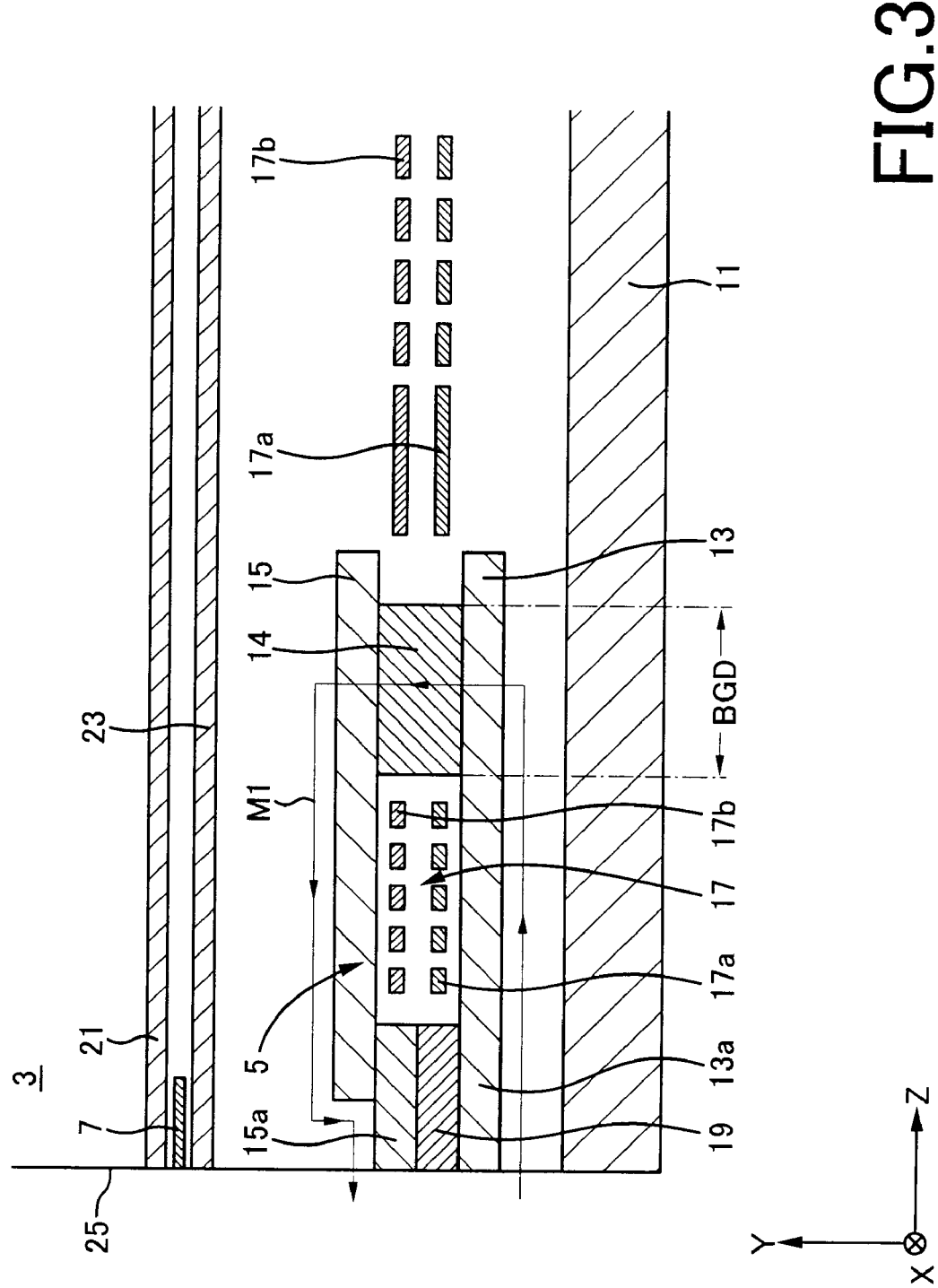
FIG. 3 is a sectional view taken along line 3-3 in FIG. 2.

FIG. 3 is a sectional view taken along line 3-3 in FIG. 2. Referring to FIGS. 2 and 3, the reproducing element 7 may be a magneto-resistive film such as a GMR or TMR film. Furthermore, an upper magnetic shield 21 and a lower magnetic shield 23 are disposed to hold the reproducing element 7 in the lamination direction Y.

The recording element 5 includes a first yoke 13, a second yoke 15, a back yoke 14 and a coil 17.

The first yoke 13 has a given width along the track width direction X and extends from a medium-facing surface 25 along a depth direction Z. The depth direction Z refers to a direction perpendicular to both the track width direction X and the lamination direction Y. The first yoke 13 has a first pole 13a on the side close to the medium-facing surface 25. The first pole 13a is exposed on the medium-facing surface 25 and flush with the medium-facing surface 25. In addition, the first pole 13a has a width PW1 taken along the track width direction X at the medium-facing surface 25 (see FIG. 2). In the present embodiment, the first pole 13a is integral with the first yoke 13, but they may be separate from each other.

The second yoke 15 is spaced apart from the first yoke 13 in the lamination direction Y and extends from the medium-facing surface 25 along the depth direction Z. The second yoke 15 has a second pole 15a on the side close to the medium-facing surface 25. The second pole 15a is opposed to the first pole 13a in the lamination direction Y with a gap film 19 interposed therebetween. Like the first pole 13a, the second pole 15a is exposed on the medium-facing surface 25 and flush with the medium-facing surface 25. In addition, the second pole 15a has a width PW2 taken along the track width direction X at the medium-facing surface 25 (see FIG. 2). In the present embodiment, the second pole 15a is separate from the second yoke 15, but they may be integral with each other.

Of the width PW1 of the first pole 13a and the width PW2 of the second pole 15a, the shorter one is taken as pole width PW. In the present embodiment, since the width PW2 of the second pole 15a is shorter than the width PW1 of the first pole 13a, the width PW2 of the second pole 15a is taken as pole width PW, but it is also possible that the width PW1 of the first pole 13a is shorter than the width PW2 of the second pole 15a.

The back yoke 14 is located between the first yoke 13 and the second yoke 15 and behind the medium-facing surface 25 in the depth direction Z and connects the first yoke 13 and the second yoke 15.

Figure 4:
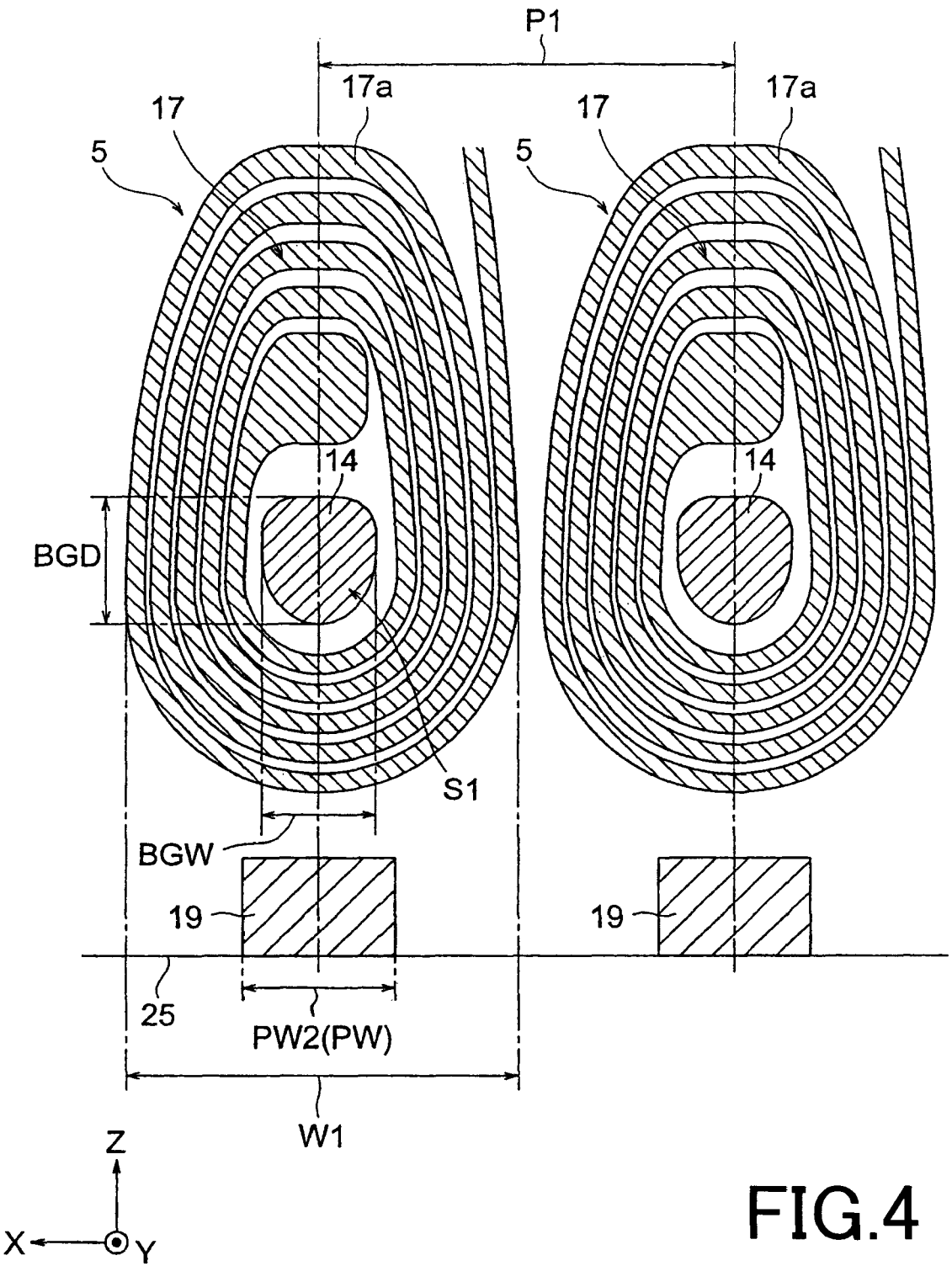
FIG. 4 is a sectional view taken along line 4-4 in FIG. 2.

FIG. 4 is a sectional view taken along line 4-4 in FIG. 2. FIG. 4 shows a section of the back yoke 14 taken along a plane parallel to the track width direction X and the depth direction Z. The section of the back yoke 14 has a width BGW taken along the track width direction X and a depth BGD taken along the depth direction Z. For example, the sectional shape of the back yoke 14 may be oval or rectangular.

The coil 17 is wound around the back yoke 14. More specifically, the illustrated coil 17 has an upper and lower two-layered structure of an upper coil layer 17a and a lower coil layer 17b (see FIG. 3). The upper coil layer 17a and the lower coil layer 17b are each disposed on a plane parallel to the track width direction X and the depth direction Z in such a manner as to wind around the back yoke 14.

In the above recording element 5, the first yoke 13 has the first pole 13a on the side close to the medium-facing surface 25 and extends from the medium-facing surface 25 along the depth direction Z. Likewise, the second yoke 15 has the second pole 15a on the side close to the medium-facing surface 25 and extends from the medium-facing surface 25 along the depth direction Z. In addition, the back yoke 14 is located between the first yoke 13 and the second yoke 15 and behind the medium-facing surface 25 in the depth direction Z and connects the first yoke 13 and the second yoke 15. This provides a magnetic circuit from the first pole 13a, through the first yoke 13, the back yoke 14 and the second yoke 15, to the second pole 15a.

From the viewpoint of the magnetic circuit, the first and second poles 13a, 15a function to increase the magnetic flux density such that a magnetic flux M1 transmitted from the first and second yokes 13, 15 is concentrated in the track width direction X.

In addition, since the magnetic flux M1 generated at the coil 17 has to be transmitted smoothly to the first and second yokes 13, 15 through the back yoke 14, a sectional area S1 of the back yoke 14 taken along a plane parallel to the track width direction X and the depth direction Z should be sufficiently large to transmit the magnetic flux M1. To this end, heretofore, the width BGW of the back yoke 14 has been typically larger than the pole width PW, thereby providing the back yoke 14 with a sufficient sectional area S1.

In the present embodiment, on the other hand, the width BGW of the back yoke 14 is made smaller than the pole width PW so as to decrease the pitch distance P1 between adjacent recording elements 5. With this configuration, a width W1 of the coil 17 taken along the track width direction X can be decreased as compared with the conventional configuration where the back yoke width is larger than the pole width. This results in that the recording elements 5 can be arranged densely in the track width direction X, i.e., decreasing the pitch distance P1 between adjacent recording elements 5.

With the width BGW of the back yoke 14 being smaller than the pole width PW, moreover, there can be ensured an allowance area for increasing the winding number (i.e., the number of turns) of the coil 17 without causing mutual interference of coils between adjacent recording elements.

However, when the width BGW of the back yoke 14 is made smaller than the pole width PW, as described above, there may be a problem that the magnetic flux M1 cannot be transmitted smoothly through the back yoke 14 because of its decreased sectional area S1.

In order to prevent the above problem, furthermore, the depth BGD of the back yoke 14 is made larger than the width BGW of the back yoke 14. In this configuration, the sectional area of the back yoke 14 can be made sufficiently large to transmit the magnetic flux M1 by increasing the depth BGD of the back yoke 14.

Even in this case, the winding number of the coil 17 can be increased without causing mutual interference of coils as described above. Thus, the recording elements 5 can generate a sufficient recording magnetic field.

To sum up the above, if the pole width PW and the width BGW and depth BGD of the back yoke 14 satisfy BGW<PW and BGD>BGW, the recording elements 5 can generate a sufficient recording magnetic field even though having a small pitch distance P1.

Next will be described various advantages of the present invention with reference to the following simulation data.

In the structure of the multi-channel head illustrated in FIGS. 1 to 4, firstly, the pole width PW was fixed at 7 μm. Then, the back yoke width BGW was set at 10 μm, 6 μm and 2 μm, and accordingly the coil winding number was set at 14, 16 and 18. They were taken as Samples 1, 2 and 3.

Secondly, the pole width PW was fixed at 9 μm. Then, the back yoke width BGW and the coil winding number were set in the same manner as in Samples 1, 2 and 3. They were taken as Samples 4, 5 and 6.

Thirdly, the pole width PW was fixed at 11 μm. Then, the back yoke width BGW and the coil winding number were set in the same manner as in Samples 1, 2 and 3. They were taken as Samples 7, 8 and 9.

In Samples 1 to 9, furthermore, the back yoke depth BGD was fixed at 12 μm. The dimensions and coil winding number of Samples 1 to 9 are shown in Table 1.

TABLE 1

| Sample No. | Pole width (PW) | Back yoke width (BGW) | Back yoke depth (BGD) | Coil winding number |
|---|---|---|---|---|
| 1 | 7 μm | 10 μm | 12 μm | 14 |
| 2 | as above | 6 μm | as above | 16 |
| 3 | as above | 2 μm | as above | 18 |
| 4 | 9 μm | 10 μm | as above | 14 |
| 5 | as above | 6 μm | as above | 16 |
| 6 | as above | 2 μm | as above | 18 |
| 7 | 11 μm | 10 μm | as above | 14 |
| 8 | as above | 6 μm | as above | 16 |
| 9 | as above | 2 μm | as above | 18 |

For Samples 1 and 9, then, the value of write magnetic field (or recording magnetic field) was measured in a simulation in which a current flowing through the coil of the recording element was set at 0 mA, 10 mA, 20 mA and 30 mA. In multi-channel heads, typically, the current flowing through the coil varies in the range of 0 to 20 mA. From the viewpoint of improving the write characteristic, moreover, the magnitude of write magnetic field is important at the rise of the current. Accordingly, the evaluation of the magnitude of write magnetic field should be made at a current of 0 to 20 mA.

Figure 5:
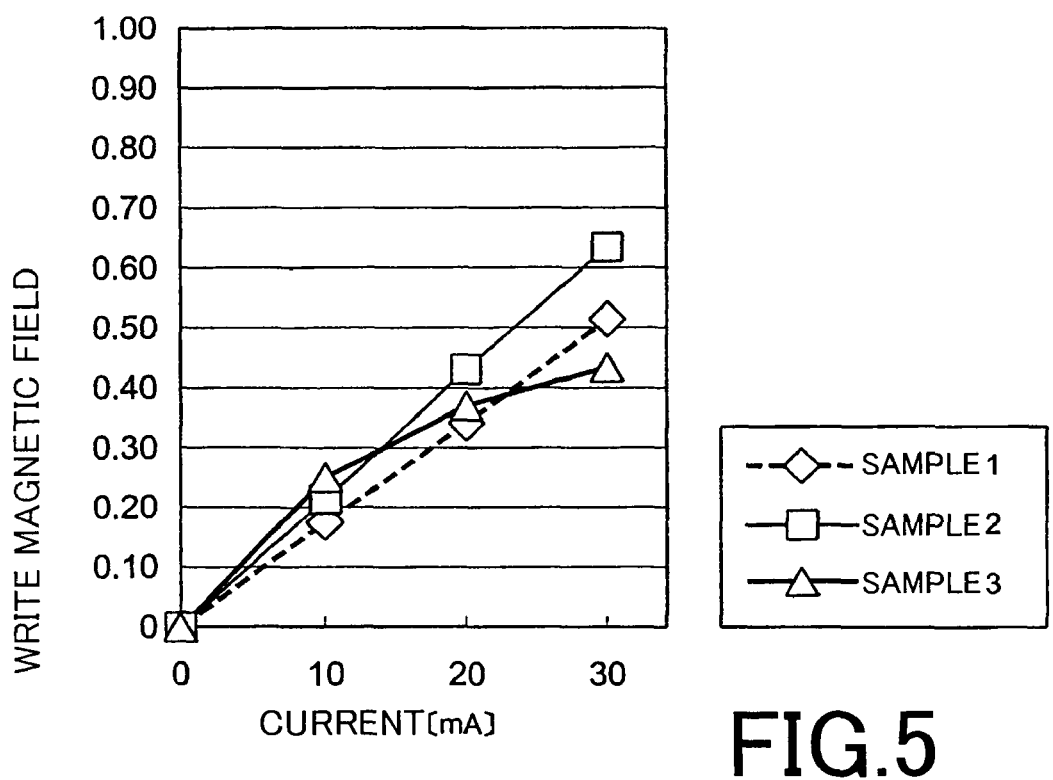
FIG. 5 is a diagram showing simulation results of Samples 1 to 3.

Firstly, the simulation results of Samples 1 to 3 are plotted in FIG. 5. In this diagram, the current [mA] is taken along the abscissa and the write magnetic field [A/m] is taken along the ordinate. While the current was in the range of 0 to 20 mA, the write magnetic field was larger in Samples 2 and 3, in which the back yoke width BGW was smaller than the pole width PW, than in Sample 1, in which the back yoke width BGW was larger than the pole width PW. For instance, when the current was 10 mA, Sample 1 had a write magnetic field of 0.17 A/m, while Samples 2 and 3 had a larger write magnetic field of 0.21 A/m and 0.25 A/m, respectively.

Figure 6:
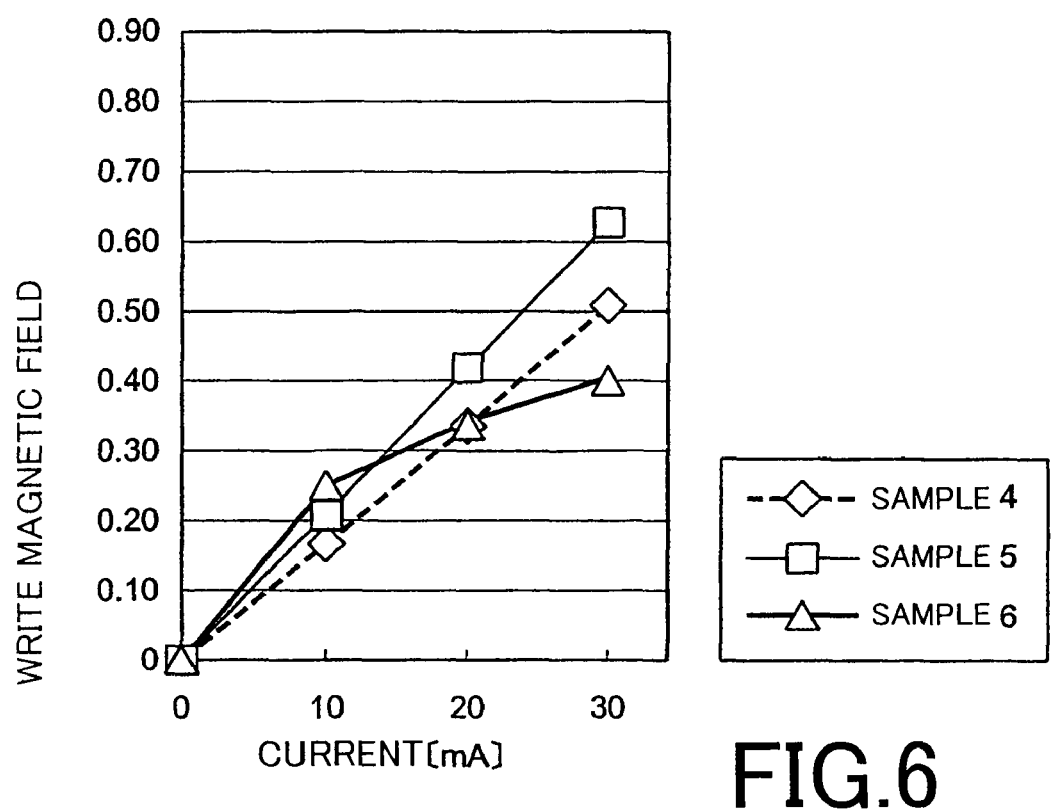
FIG. 6 is a diagram showing simulation results of Samples 4 to 6.

Secondly, the simulation results of Samples 4 to 6 are plotted in FIG. 6. While the current was in the range of 0 to 20 mA, the write magnetic field was larger in Samples 5 and 6, in which the back yoke width BGW was smaller than the pole width PW, than in Sample 4, in which the back yoke width BGW was larger than the pole width PW. For instance, when the current was 10 mA, Sample 4 had a write magnetic field of 0.17 A/m, while Samples 5 and 6 had a larger write magnetic field of 0.21 A/m and 0.25 A/m, respectively.

It is seen from the above that the write characteristic at the rise of the current can be improved by making the back yoke width BGW larger than the pole width PW.

Regarding the other Samples 7 to 9, since the back yoke width BGW was smaller than the pole width PW in any sample, the comparison is impossible and therefore no simulation result is plotted.

Moreover, how much the back yoke width BGW could be reduced was investigated. In this investigation, how the write magnetic field varied with decreasing the back yoke width BGW was observed with reference to a write magnetic field at the time when the back yoke width BGW was equal to the pole width PW. Here, the write magnetic field was measured at a current of 20 mA. The details are as follows.

At first, the write magnetic field value at the time when both the pole width PW and the back yoke width BGW were 10 μm was calculated by interpolation using Sample 1 (pole width PW of 7 μm, back yoke width BGW of 10 μm), Sample 3 (pole width PW of 9 μm, back yoke width BGW of 10 μm) and Samples 7 (pole width PW of 11 μm, back yoke width BGW of 10 μm). This value was used as an evaluation criterion.

Figure 7:
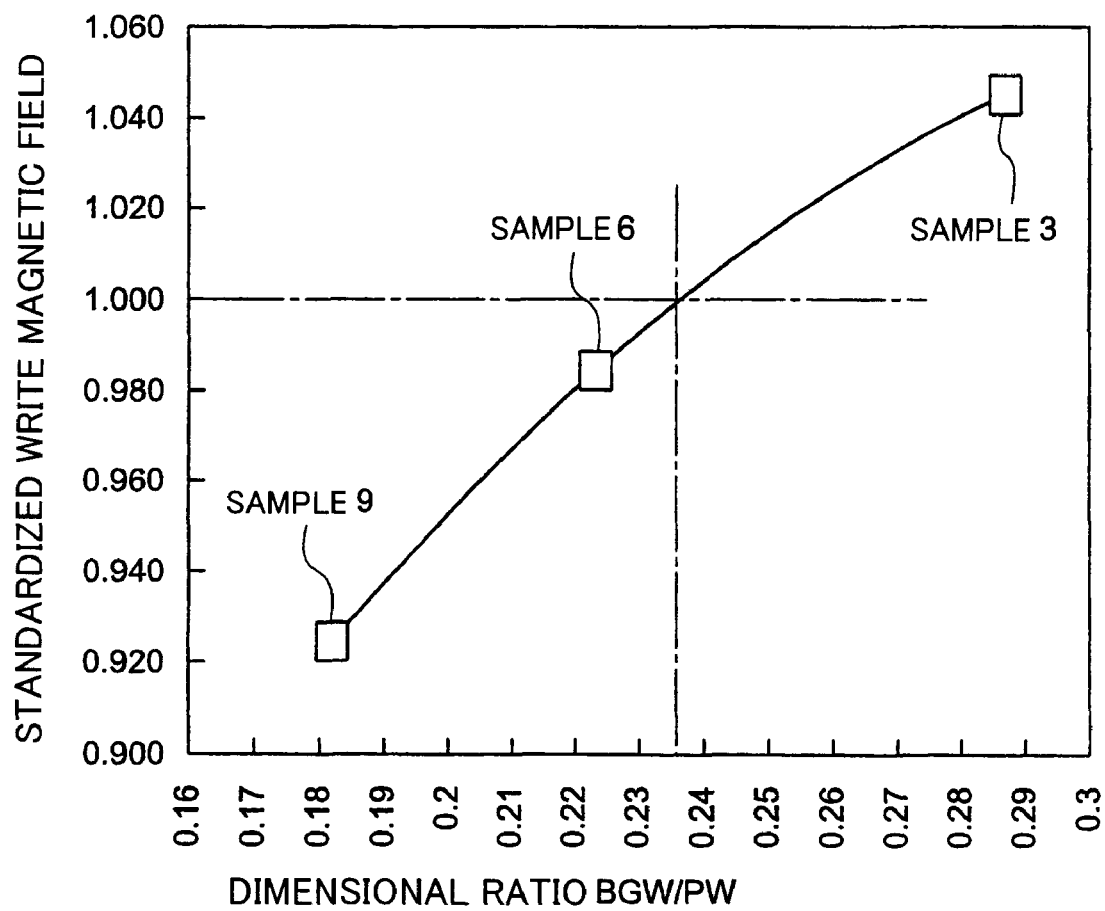
FIG. 7 is a diagram in which a dimensional ratio BGW/PW is taken along the abscissa and a standardized write magnetic field value is taken along the ordinate.

Then, the dimensional ratio BGW/PW of the back yoke width BGW to the pole width PW was calculated for Sample 3 (pole width PW of 7 μm, back yoke width BGW of 2 μm), Sample 6 (pole width PW of 9 μm, back yoke width BGW of 2 μm) and Sample 9 (pole width PW of 11 μm, back yoke width BGW of 2 μm). Furthermore, the write magnetic field values of Samples 3, 6 and 9 were standardized by the above value at the time when both the pole width PW and the back yoke width BGW were 10 μm. FIG. 7 shows a diagram in which the dimensional ratio BGW/PW is taken along the abscissa and the standardized write magnetic field value is taken along the ordinate.

Referring to the diagram of FIG. 7, when the back yoke width BGW was considerably reduced and the dimensional ratio BGW/PW of the back yoke width BGW to the pole width PW was less than 0.24, the write magnetic field became smaller than when the back yoke width BGW was equal to the pole width PW. This may be because when the width BGW of the back yoke 14 was too small with respect to the pole width PW, the effective yoke length became too long, thereby decreasing the write magnetic field.

On the other hand, it is also seen that when the dimensional ratio BGW/PW of the back yoke width BGW to the pole width PW was equal to or greater than 0.24, the resulting write magnetic field was equal to or greater than when the back yoke width BGW was equal to the pole width PW. This may be because the increase in effective yoke length was suppressed by setting the dimensional ratio BGW/PW equal to or greater than 0.24, thereby preventing the decrease in write magnetic field.

In the foregoing embodiment, the recording elements 5 arranged in the track width direction X each satisfy BGW<PW and BGD>BGW, but the present invention should not be construed as limited thereto. In this regard, it is obvious that even if only one of the recording elements satisfies BGW<PW and BGD>BGW, for example, the said recording element has the above mentioned basic effects that the pitch distance between the said recording element and another recording element adjacent thereto can be reduced and the said recoding element can generate a sufficient recording magnetic field.

It is also obvious that even in a case where the width PW1 of the first pole 13a is smaller than the width PW2 of the second pole 15a and therefore the width PW1 of the first pole 13a is taken as pole width PW, unlike in the foregoing embodiment, the same effects can be obtained.

While the present invention has been particularly shown and described with reference to embodiments thereof, it will be understood by those skilled in the art that various changes in form and detail may be made therein without departing from the spirit, scope and teaching of the invention.

What is claimed is:

1. A multi-channel head comprising:
   a substrate; and
   a plurality of recording elements arranged on said substrate in a track width direction, each recording element comprising:
   a first yoke having a first pole on a side close to a medium-facing surface of said substrate;

a second yoke being spaced apart from said first yoke in a lamination direction of said substrate and having a second pole on a side close to said medium-facing surface;

a back yoke being located behind said medium-facing surface in a depth direction perpendicular to both said lamination direction of said substrate and said track width direction and connecting said first yoke and said second yoke; and a coil being wound around said back yoke, wherein at least one of said recording elements satisfies BGW<PW and BGD>BGW, where PW represents a shorter one of a width of said first pole taken along said track width direction at said medium-facing surface and a width of said second pole taken along said track width direction at said medium-facing surface, BGW represents a width of said back yoke taken along said track width direction, and BGD represents a depth of said back yoke taken along said depth direction.

2. The multi-channel head of claim 1, wherein at least one of said recording elements further satisfies BGW/PW≧0.24.

* * * * *